(12) United States Patent
Quix et al.

(10) Patent No.: US 9,103,275 B2
(45) Date of Patent: Aug. 11, 2015

(54) SUPERCHARGED INTERNAL COMBUSTION ENGINE AND METHOD FOR OPERATING AN INTERNAL COMBUSTION ENGINE OF SAID TYPE

(71) Applicant: Ford Global Technologies, LLC, Dearborn, MI (US)

(72) Inventors: Hans Guenter Quix, Herzogenrath (DE); Franz Arnd Sommerhoff, Aachen (DE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/223,906

(22) Filed: Mar. 24, 2014

(65) Prior Publication Data

US 2014/0299112 A1    Oct. 9, 2014

(30) Foreign Application Priority Data

Apr. 9, 2013    (DE) .......................... 10 2013 206 230

(51) Int. Cl.

| F02B 39/04 | (2006.01) |
|---|---|
| F02B 33/34 | (2006.01) |
| F02B 39/00 | (2006.01) |
| F02B 29/04 | (2006.01) |
| F02M 25/07 | (2006.01) |

(52) U.S. Cl.
CPC .............. *F02B 33/34* (2013.01); *F02B 29/0443* (2013.01); *F02B 39/005* (2013.01); *F01P 2060/12* (2013.01); *F01P 2060/18* (2013.01); *F02M 25/0731* (2013.01)

(58) Field of Classification Search
CPC .............. F01P 2060/12; F01P 2060/18; F02B 29/0443; F02B 33/34; F02B 39/005; F02M 25/0731
USPC ............................... 60/39.6–39.63, 597–624; 123/559.1–566, 200–249
See application file for complete search history.

(56) References Cited

U.S. PATENT DOCUMENTS

| 4,236,492 A | 12/1980 | Tholen |
| 5,415,147 A * | 5/1995 | Nagle et al. ................... 123/563 |
| 8,020,538 B2 | 9/2011 | Surnilla et al. |
| 8,186,159 B2 * | 5/2012 | Martins et al. .................. 60/612 |
| 8,689,555 B2 * | 4/2014 | Wong ........................... 60/605.3 |

(Continued)

FOREIGN PATENT DOCUMENTS

| DE | 102010042104 A1 | 4/2012 |
| EP | 1724453 A1 | 11/2006 |
| EP | 2292913 A1 | 3/2011 |
| GB | 2487240 A | 7/2012 |

(Continued)

*Primary Examiner* — Jesse Bogue
(74) *Attorney, Agent, or Firm* — Greg Brown; Alleman Hall McCoy Russell & Tuttle LLP

(57) ABSTRACT

A method and system is provided to heat and cool the charge air in an intake system via a compressor coolant duct to reduce condensate formation on the one hand respectively increase charge air cooling on the other hand. Potential heat sources for the low temperature circuit do include the high temperature engine cooling circuit as well as exhaust gas. A shut-off element arranged in a bypass line about the heat exchanger may be adjusted to control delivery responsive to the charge air temperature condition.

19 Claims, 7 Drawing Sheets

(56) References Cited

U.S. PATENT DOCUMENTS

| | | | |
|---|---|---|---|
| 2003/0049139 A1* | 3/2003 | Coney et al. | 417/243 |
| 2009/0130928 A1* | 5/2009 | Taylor et al. | 440/88 M |
| 2009/0143957 A1* | 6/2009 | Dolker | 701/103 |
| 2011/0000469 A1* | 1/2011 | Lauberts et al. | 123/564 |

FOREIGN PATENT DOCUMENTS

| | | |
|---|---|---|
| JP | S60224938 A | 11/1985 |
| JP | 5038992 B2 | 10/2012 |
| WO | 2011073512 A1 | 6/2011 |

\* cited by examiner

SUPERCHARGED INTERNAL COMBUSTION ENGINE AND METHOD FOR OPERATING AN INTERNAL COMBUSTION ENGINE OF SAID TYPE

CROSS REFERENCE TO RELATED APPLICATIONS

The present application claims priority to German Patent Application No. 102013206230.3, filed on Apr. 9, 2013, the entire contents of which are hereby incorporated by reference for all purposes.

BACKGROUND/SUMMARY

Internal combustion engines may utilize a supercharger or turbocharger to compress ambient air entering the engine in order to increase power. Further, engines may recirculate a portion of exhaust gas from the exhaust line to upstream of a compressor of the supercharger at increasing rates to decrease NOx emissions. At high exhaust-gas recirculation rates, the fraction of gaseous components in the charge air increase. When a temperature of the charge air, a mixture of ambient air and recirculated exhaust gas, falls below a dew point temperature, condensate may form in the compressor and/or intake line. Condensate formation may lead to compressor wheel damage and/or irreversible damage of components downstream of the compressor.

One example method to avoid condensate formation is shown by Eitel et al in EP 1724453. Therein, a two stage exhaust gas cooler is placed on the exhaust gas recirculation (EGR) line, in order to lower the temperature below a components dew point, followed by a condensate trap in order to remove unwanted components in the exhaust gas. The exhaust gas is then mixed with the intake air, after condensate removal, downstream the compressor. Another example method is shown by Raunio in EP 2513449. A high temperature cooling circuit and a low temperature cooling circuit are used to cool intake air. The system uses multiple heat exchangers in series and includes one junction to provide high temperature cooling liquid to the low temperature cooling circuit heat exchanger located upstream of the compressors.

However, the inventors herein have recognized potential issues with such systems. As one example, lowering the temperature of the EGR line does not account for condensate formation which may occur in the intake line, leading to condensate formation which may irreversibly damage system components. In another example, utilizing multiple heat exchangers leads to increased costs and system complexity.

The inventors herein have recognized the above issues and developed a supercharged internal combustion engine comprising at least one intake line, arranged in an intake system, for supplying charge air to the internal combustion engine. At least one compressor, arranged in the intake line, comprises at least one rotor mounted on a rotatable shaft and a housing in which said at least one rotor is arranged, wherein the housing has at least one integrated coolant duct and is equipped with a liquid-type cooling arrangement. Further, an at least one exhaust line, arranged in an exhaust gas discharge system, is provided for discharging exhaust gases, wherein an exhaust-gas recirculation arrangement, the recirculation line of which branches off from the exhaust-gas discharge system and issues into the intake system upstream the compressor is included. The system forms a liquid-type cooling arrangement, wherein a cooling circuit is provided through the at least one coolant duct integrated in the housing, and wherein a heat exchanger is arranged in the cooling circuit upstream of the housing, which heat exchanger serves for heating the cooling liquid, and the at least one compressor is a constituent part of an exhaust-gas turbocharger.

As an example, the heat exchanger may be coupled to a heated coolant to transfer heat from the heated coolant to the cooling liquid. The heated cooling liquid may then be passed directly from the heat exchanger to the intake compressor housing coolant duct in order to heat the charge air to reduce condensation formation. Further, the coolant flow through the heat exchanger may be adjusted responsive to the charge air temperature being over a threshold via switching a shut-off valve positioned in a bypass line branching upstream of a heat exchanger and re-joining downstream the heat exchanger and upstream the intake compressor housing. In one example, switching the shut-off valve to a closed position, when the charge air temperature is below a dew point temperature, allows coolant flow through the heat exchanger and blocks coolant flow through the bypass. In another example, switching the shut-off valve to an open position allows coolant flow through the bypass line and blocks coolant flow through the heat exchanger, when a charge air temperature is above a first threshold. The cooling liquid temperature may then be adjusted to reduce condensation and allow high exhaust-gas recirculation rates.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
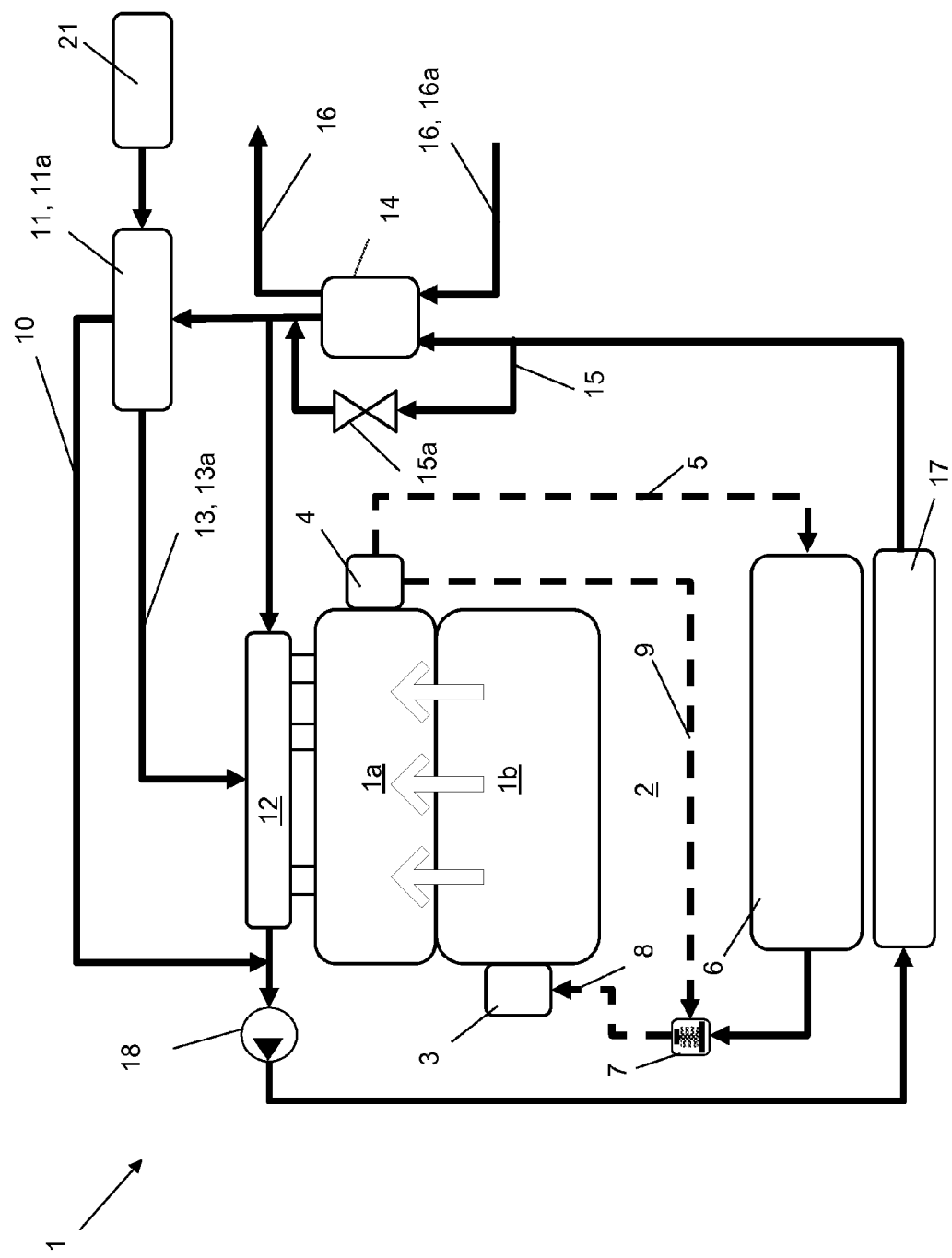
FIG. 1 schematically shows a first embodiment of the supercharged internal combustion engine.

The present application relates to a supercharged internal combustion engine comprising at least one intake line, assigned to an intake system, for supplying charge air to the internal combustion engine, at least one exhaust line, assigned to an exhaust-gas discharge system, for discharging the exhaust gases, at least one compressor which is arranged in the at least one intake line and which comprises at least one rotor mounted on a rotatable shaft and a housing in which said at least one rotor is arranged, wherein the compressor is equipped with a liquid-type cooling arrangement, for which purpose the housing has at least one integrated coolant duct, and an exhaust-gas recirculation arrangement, the recirculation line of which branches off from the exhaust-gas discharge system and issues into the intake system upstream of the compressor. The internal combustion engine further comprises, to form the liquid-type cooling arrangement, a cooling circuit which leads through the at least one coolant duct integrated in the housing, wherein a heat exchanger is arranged in the cooling circuit upstream of the housing, which heat exchanger serves for heating the cooling liquid, and the at least one compressor is a constituent part of an exhaust-gas turbocharger.

The present application also relates to a method for operating an internal combustion engine of said type.

An internal combustion engine of the stated type is used for example as a drive for a motor vehicle. Within the context of the present application, the expression "internal combustion engine" encompasses diesel engines, Otto-cycle engines, and also hybrid internal combustion engines, which utilize a hybrid combustion process, and hybrid drives which comprise the internal combustion engine and also an electric machine which is connected in terms of drive to the internal combustion engine and which receives power from the internal combustion engine or which, as a switchable auxiliary drive, outputs additional power.

Internal combustion engines are ever more commonly being equipped with supercharging, wherein supercharging is primarily a method for increasing power, in which the charge air for the combustion process in the engine is compressed, as a result of which a greater mass of charge air may be supplied to each cylinder per working cycle. In this way, the fuel mass and therefore the mean effective pressure can be increased.

For supercharging, use is often made of an exhaust-gas turbocharger in which a compressor and a turbine are arranged on the same shaft, with the hot exhaust-gas flow being supplied to the turbine, expanding in said turbine with a release of energy, and thereby setting the shaft in rotation. The energy supplied by the exhaust-gas flow to the shaft is used for driving the compressor which is likewise arranged on the shaft. The compressor delivers and compresses the charge air supplied to it, as a result of which supercharging of the cylinders is obtained.

Nevertheless, use may also be made of a mechanical charger which has a mechanical connection to the internal combustion engine for the purpose of transmitting power. While a mechanical charger draws the energy for driving it directly from the internal combustion engine, the exhaust-gas turbocharger utilizes the exhaust-gas energy of the hot exhaust gases.

The torque characteristic of the supercharged internal combustion engine may be enhanced through the provision of multiple exhaust-gas turbochargers which are connected in parallel or in series, and/or the combination of exhaust-gas turbocharging and a mechanical charger. The internal combustion engine according to the present application has at least one compressor. The at least one compressor comprises at least one rotatably mounted rotor, and may also have two or more rotors if it is formed as a multi-stage compressor, and one or more guide wheels.

Supercharging is a suitable means for increasing the power of an internal combustion engine while maintaining an unchanged swept volume, or for reducing the swept volume while maintaining the same power. Supercharging leads to an increase in volumetric power output and an enhanced power-to-weight ratio. For the same vehicle boundary conditions, it is thus possible to shift the load collective toward higher loads, at which the specific fuel consumption is lower.

Supercharging assists in the constant efforts in the development of internal combustion engines to minimize fuel consumption, that is to say to enhance the efficiency of the internal combustion engine. With targeted configuration of the supercharging, it is also possible to obtain advantages with regard to exhaust-gas emissions. With suitable supercharging for example of a diesel engine, the nitrogen oxide emissions can therefore be reduced without losses in efficiency. The hydrocarbon emissions can be favorably influenced at the same time. The emissions of carbon dioxide, which correlate directly with fuel consumption, likewise decrease with falling fuel consumption.

To adhere to future threshold values for pollutant emissions, however, further measures may be considered. Here, the focus of the development work is on inter alia the reduction of nitrogen oxide emissions, which are of high relevance, for example in diesel engines. Since nitrogen oxides form in an excess of air and also high temperatures, one concept for lowering the nitrogen oxide emissions includes developing combustion processes with lower combustion temperatures.

Here, exhaust-gas recirculation (EGR), that is to say the recirculation of combustion gases from the outlet side to the inlet side, is expedient in achieving this aim, wherein it is possible for the nitrogen oxide emissions to be considerably reduced with increasing exhaust-gas recirculation rate. Here, the exhaust-gas recirculation rate $x_{EGR}$ is determined as $x_{EGR}=m_{EGR}(m_{EGR}+m_{fresh\ air})$, where $m_{EGR}$ denotes the mass of recirculated exhaust gas and $m_{fresh\ air}$ denotes the supplied fresh air.

To obtain a considerable reduction in nitrogen oxide emissions, high exhaust-gas recirculation rates are required which may be of the order of magnitude of $x_{EGR} \approx 60\%$ to 70%.

When operating an internal combustion engine with exhaust-gas turbocharging and an exhaust-gas recirculation arrangement, a conflict may arise if the recirculated exhaust gas is extracted from the exhaust-gas discharge system upstream of the turbine by means of high-pressure EGR and is no longer available for driving the turbine.

In the event of an increase in the exhaust-gas recirculation rate, the exhaust-gas flow introduced into the turbine correspondingly decreases. The reduced exhaust-gas mass flow through the turbine leads to a lower turbine pressure ratio, as a result of which the charge pressure ratio also falls, which equates to a smaller compressor mass flow. Aside from the decreasing charge pressure, potential issues may arise in the operation of the compressor, for example with regard to the surge limit. Disadvantages may also arise with regard to the pollutant emissions, for example with regard to the formation of soot in diesel engines during acceleration.

For this reason, concepts are required which—for example in the part-load range—better enable adequately high charge pressures with high exhaust-gas recirculation rates. One proposed solution is so-called low-pressure EGR.

In contrast to the above mentioned high-pressure EGR arrangement, in which exhaust gas is extracted from the exhaust-gas discharge system upstream of the turbine and introduced into the intake system downstream of the compressor, in the case of a low-pressure EGR arrangement exhaust gas which has already flowed through the turbine is recirculated to the inlet side. For this purpose, the low-pressure EGR arrangement comprises a recirculation line which branches off from the exhaust-gas discharge system downstream of the turbine and issues into the intake system upstream of the compressor.

An internal combustion engine which is supercharged by means of a compressor, and in which the recirculation line of the EGR arrangement issues into the intake system upstream of the compressor, is also the subject matter of the present application.

The exhaust gas which is recirculated via the low-pressure EGR arrangement to the inlet side is mixed with fresh air upstream of the compressor. The mixture of fresh air and recirculated exhaust gas produced in this way forms the charge air which is supplied to the compressor and compressed, wherein the compressed charge air is often also cooled, downstream of the compressor, in a charge-air cooler.

Here, it is not disadvantageous that exhaust gas is conducted through the compressor during the course of the low-pressure EGR, because in general exhaust gas is used which has been subjected to exhaust-gas aftertreatment, for example in the particle filter. There is therefore no risk of depositions in the compressor which change the geometry of the compressor, in particular the flow cross sections, and thereby impair the efficiency of the compressor.

By contrast, owing inter alia to the cooling of the compressor, potential issues may arise during the compression, for example after a cold start of the internal combustion engine. During the course of the cooling and compression, liquids previously contained in the charge air still in gaseous form, for example water, and may condense if the dew point temperature of a component of the gaseous charge-air flow is undershot. If the precipitated condensate is not discharged, and supplied to the cylinders, continuously in extremely small quantities by the charge-air flow on the basis of kinetics, condensate may accumulate in the intake system, for example in the compressor and/or charge-air cooler, which condensate is then abruptly introduced unpredictably and in relatively large quantities from the intake system into the cylinders, for example in the event of lateral acceleration during cornering or when traveling on a gradient or over a bump. The latter is also referred to as water hammer, which can lead to a severe disruption in the operation of the internal combustion engine and rather may also lead to irreversible damage of components downstream of the compressor.

The potential issue described above is intensified with increasing recirculation rate, because with the increase of the recirculated exhaust-gas flow rate, the fractions of the individual exhaust-gas components in the charge air, in particular of the water contained in the exhaust gas, inevitably increase. In the prior art, therefore, the exhaust-gas flow rate recirculated via the low-pressure EGR arrangement is limited in order to reduce the condensed water quantity. The limitation of the low-pressure EGR opposes the aim of considerably lowering nitrogen oxide emissions by means of EGR, and opposes the aim of lowering the high-pressure EGR recirculation rates by means of low-pressure EGR in order to reduce potential issues with regard to charge pressure and/or charge-air mass.

In the prior art, the required high recirculation rates may be obtained by means of high-pressure EGR, wherein the associated disadvantages occur. The advantages of low-pressure EGR may be utilized to a limited extent.

Against the background of that stated above, it is an object of the present application to provide a supercharged internal combustion engine according to the preamble of claim 1, by means of which the disadvantages known from the prior art with regard to condensate formation are overcome and by means of which in particular high exhaust-gas recirculation rates can be realized by means of low-pressure EGR.

It is a further sub-object to specify a method for operating an internal combustion engine of said type.

The first sub-object is achieved by means of a supercharged internal combustion engine comprising at least one intake line, assigned to an intake system, for supplying charge air to the internal combustion engine, at least one exhaust line, assigned to an exhaust-gas discharge system, for discharging the exhaust gases, at least one compressor which is arranged in the at least one intake line and which comprises at least one rotor mounted on a rotatable shaft and a housing in which said at least one rotor is arranged, wherein the compressor is equipped with a liquid-type cooling arrangement, for which purpose the housing has at least one integrated coolant duct, and an exhaust-gas recirculation arrangement, the recirculation line of which branches off from the exhaust-gas discharge system and issues into the intake system upstream of the compressor, which internal combustion engine further comprises, to form the liquid-type cooling arrangement, a cooling circuit is provided which leads through the at least one coolant duct integrated in the housing, wherein a heat exchanger is arranged in the cooling circuit upstream of the housing, which heat exchanger serves for heating the cooling liquid, and the at least one compressor is a constituent part of an exhaust-gas turbocharger.

The internal combustion engine according to the present application has a liquid-cooled compressor, wherein the cooling arrangement may be or is utilized to increase the charge-air temperature in the compressor, that is to say serves as a heater. For this purpose, a heat exchanger is provided in the cooling circuit upstream of the compressor housing, which heat exchanger serves for heating the cooling liquid, wherein the cooling liquid that is heated in the heat exchanger, as it flows downstream through the at least one coolant duct integrated in the housing, introduces heat into the housing and thus indirectly also heats the charge air situated in the compressor.

Raising the charge-air temperature to a temperature above a specific dew point temperature counteracts the condensation of a component contained in the charge air in gaseous form, for example the condensation of the water contained in the charge air. With the internal combustion engine according to the present application, condensation can be reliably reduced even under adverse operating conditions, such as, after a cold start and/or at low ambient temperatures.

Here, the specific dew point temperature may be the dew point temperature of any component of the gaseous charge-air flow. For example, the dew point temperature of the water contained in the charge air in gaseous form.

The reduction of the condensation also reduces the potential issues associated therewith; specifically an accumulation of condensate in the intake system, and the water hammer that commonly arises as a result.

According to the present application, to form a liquid-type cooling arrangement, the housing has at least one integrated coolant duct, such that the temperature can basically be influenced over large parts of the housing.

The liquid-type cooling arrangement may also be used, corresponding to its originally intended purpose, for cooling the charge air. By means of the cooling during the compression, it is advantageously possible for the efficiency of the compressor to be influenced. If, for simplicity, the compression is regarded as a stepped increase in pressure, the cooling of the air during the compression has the effect that a lower compression temperature is present after each incremental pressure increase than in the case of an uncooled compression. The lower compression temperature yields a higher density of the compressed combustion air and thus a lower volume flow, which in turn means that a lower compressor power is required for a discrete pressure rise, for which reason efficiency is increased, because for a given mass flow, the same charge pressure is achieved with less compressor work. Since a higher efficiency leads, per se, to a lower compression temperature, synergetic effects are even attained during the course of the cooling.

The liquid-type cooling of the compressor necessitates that the housing be equipped with at least one coolant duct, that is to say necessitates the provision of coolant ducts which conduct the coolant through the housing. The heat is not initially conducted to the housing surface in order to be discharged, but instead is dissipated to the coolant, generally water provided with additives, already in the interior of the housing. Here, the coolant is fed by means of a pump arranged in the cooling circuit, such that said coolant circulates in the coolant duct. The heat dissipated to the coolant is discharged from the interior of the housing in this way, and is extracted from the coolant again in a heat exchanger.

Cooling of the compressor also offers advantages with regard to a ventilation flow fed into the intake system upstream of the compressor, which ventilation flow serves for the ventilation of the crankcase and, as constituents, also includes oil and unburned hydrocarbons which can be deposited in the compressor, in particular on the housing walls and on the blades of the rotor. Specifically, tests have shown that the outlet temperature of the compressor is the significant influential variable as regards the occurrence and the degree of fouling of the compressor. Furthermore, it has been identified that fouling can be substantially reduced as long as the outlet temperature does not exceed a threshold temperature.

The internal combustion engine achieves the first object on which the present application is based, that is to say a supercharged internal combustion engine is provided by means of which the disadvantages known from the prior art with regard to condensate formation are overcome and by means of which in particular high exhaust-gas recirculation rates can be realized by means of low-pressure EGR.

According to the present application, the at least one compressor is a constituent part of an exhaust-gas turbocharger. The advantage of the exhaust-gas turbocharger for example in relation to a mechanical charger is that no mechanical connection for transmitting power is required between the charger and internal combustion engine. A mechanical charger draws the energy for driving it from the internal combustion engine, and thereby reduces the power output and efficiency.

Nevertheless, an internal combustion engine according to the present application may have a mechanical charger as an additional compressor. Specifically, in the case of the supercharging of the internal combustion engine by means of exhaust-gas turbocharging, a significant torque drop is observed if a certain rotational speed is undershot.

Said torque drop is understandable if one takes into consideration that, in the case of an exhaust-gas turbocharger, the charge pressure ratio is dependent on the turbine pressure ratio. For example, if the engine rotational speed is reduced in the case of a diesel engine, or if the load is reduced in the case of an Otto-cycle engine, this leads to a smaller exhaust-gas mass flow and therefore to a lower turbine pressure ratio. This has the result that, toward lower engine speeds or loads respectively, the charge pressure ratio likewise decreases, which equates to a torque drop.

A mechanical charger has the advantage over an exhaust-gas turbocharger that an adequately high charge pressure can be provided even at low rotational speeds.

The described relationships often also have the effect that multiple turbochargers or combinations of exhaust-gas turbocharging and mechanical supercharging are used to enhance the torque characteristic. An internal combustion engine according to the present application may have multiple compressors which are arranged in parallel or in series and which are either a constituent part of an exhaust-gas turbocharger or are mechanical chargers.

Further advantageous embodiments of the supercharged internal combustion engine will be discussed in conjunction with the subclaims.

Embodiments of the supercharged internal combustion engine are advantageous in which a charge-air cooler is provided downstream of the at least one compressor, by means of which charge-air cooler the compressed charge air is cooled before it enters the at least one cylinder. The cooler lowers the temperature and thereby increases the density of the charge air, such that the cooler also contributes to enhanced charging of the cylinders, that is to say to a greater air mass. In effect, compression by cooling takes place.

Embodiments of the supercharged internal combustion engine are advantageous in which the compressor is a radial compressor. The radial type of construction of the compressor promotes, that is to say simplifies, in particular the cooling of the charge air during the compression, specifically such that the charge air to be compressed can be cooled over a large area over large parts of the radially outwardly extending rotor, which is not readily possible when using an axial compressor which provides little installation space for cooling of the charge air in the region of the rotor. Nevertheless, an internal combustion engine according to the present application may also be equipped with a compressor of axial type of construction.

In the case of compressors, these terms refer to the direction of the outflow from the rotor blades. In the case of a radial compressor, therefore, the outflow is substantially radial. In this context, "substantially" means that the speed component in the radial direction is greater than the axial speed component. The speed vector of the flow intersects the shaft or axle of the compressor, specifically at right angles if the outflow is exactly radial. The approaching flow may, and should preferably, be axial.

Embodiments of the supercharged internal combustion engine are advantageous in which the housing is of modular form as a multi-part housing, and comprises at least two housing segments. To be able to position the rotor in the housing, a modular and thus dismantable design of the housing may be used.

Embodiments of the supercharged internal combustion engine may however also be advantageous in which the housing is of unipartite form. Connecting elements such as for example screws and the like, and the assembly of the at least two housing parts, are then omitted.

Embodiments of the supercharged internal combustion engine are advantageous in which a bypass line for bypassing the heat exchanger is provided, wherein the bypass line branches off from the cooling circuit upstream of the heat exchanger and issues into the cooling circuit again between the housing and the heat exchanger.

Here, embodiments of the supercharged internal combustion engine are advantageous in which a shut-off element is provided in the bypass line.

If the liquid-type cooling arrangement of the compressor is not to be utilized, contrary to its intended purpose, as a heater in order to raise the charge-air temperature in the compressor, that is to say to heat the charge air, the cooling liquid can be supplied directly to the housing of the compressor via the bypass line, with the heat exchanger being bypassed, by opening the shut-off element. The liquid-type cooling arrangement is then used, corresponding to its originally intended purpose, for cooling the charge air.

If the liquid-cooling arrangement is used, corresponding to its actually intended purpose, for cooling the compressor, the charge-air temperature can be reduced by means of low-temperature cooling even in the case of relatively low loads and relatively low compression temperatures of, for example, 110° C. By means of a low-temperature cooling arrangement, the coolant supplied to the coolant jacket integrated in the housing can be cooled to temperatures of for example 30° C., 40° C. or 50° C., such that charge-air temperatures of 60° C. or 70° C. can be realized. Temperatures in this range are also expedient for improving the efficiency of the compressor.

Embodiments of the supercharged internal combustion engine are therefore also advantageous in which the cooling circuit is a low-temperature circuit.

Here, embodiments of the supercharged internal combustion engine are advantageous in which the charge-air cooler is arranged downstream of the housing in the low-temperature circuit.

Embodiments of the supercharged internal combustion engine are advantageous in which, to form an engine cooling arrangement, a high-temperature circuit is provided.

It is basically possible for the cooling arrangement of an internal combustion engine to take the form of an air-type cooling arrangement or a liquid-type cooling arrangement. Since the cylinder head and the cylinder block of a supercharged internal combustion engine are thermally more highly loaded than those of a naturally-aspirated engine, and since a liquid has a significantly greater heat capacity than air, that is to say significantly greater amounts of heat can be dissipated by means of a liquid-type cooling arrangement than by means of an air-type cooling arrangement, supercharged internal combustion engines are commonly equipped with a liquid-type cooling arrangement.

To form the liquid-type cooling arrangement, that is to say the engine cooling arrangement, the internal combustion engine, that is to say the cylinder head and/or the cylinder block, may be equipped with at least one coolant jacket, which may also provide coolant ducts, which conduct the coolant through the cylinder head and/or cylinder block. The heat is dissipated to the coolant, generally water provided with additives, in the interior of the head or block. Here, the coolant is delivered by means of a pump arranged in the cooling circuit, such that said coolant circulates. The heat dissipated to the coolant is discharged from the interior of the head or block in this way, and is extracted from the coolant again in a heat exchanger.

By contrast to the low-temperature coolant circuit described above, in which the coolant is at temperatures of, for example, 30° C., 40° C. 50° C., the engine cooling arrangement of an internal combustion engine is in the present case a high-temperature circuit, because the coolant extracted from the cooling circuit of the internal combustion engine is generally at temperatures of 80° C. or higher, specifically even if said coolant is extracted from the cooling circuit of the internal combustion engine for example upstream of the inlet into the cylinder head or cylinder block.

In the case of supercharged internal combustion engines with an engine cooling arrangement, embodiments are therefore also advantageous in which the heat exchanger is coupled to the engine cooling arrangement such that the coolant from the high-temperature circuit can serve as a heat source for heating the low temperature cooling liquid.

Embodiments of the supercharged internal combustion engine may also be advantageous in which the heat exchanger is coupled to the exhaust-gas discharge system, such that the hot exhaust gas from the internal combustion engine serves as a heat source for heating the cooling liquid.

The two embodiments above, in which the coolant from the high-temperature circuit or the hot exhaust gas from the internal combustion engine serves as a heat source, are characterized in that no additional energy is required, used and consumed for heating the cooling liquid, and instead use is made of already-existing supplies of energy, specifically either the hot exhaust gas which is generated in any case and which is otherwise discharged, unused, into the environment, or else the hot coolant from the engine cooling arrangement, from which heat is extracted continuously in order to be able to cool the engine in the first place and extract heat from the engine.

Nevertheless, embodiments of the supercharged internal combustion engine may also be advantageous in which the heat exchanger is electrically heatable such that the cooling liquid can be electrically heated. The advantages of energy recovery as described above are then duly omitted. On the other hand, advantages may also arise, for example in the event of a cold start of the internal combustion engine, if the coolant from the engine cooling arrangement is itself still cold and may be heated and/or the exhaust-gas temperatures are not high enough and/or the temperature of the exhaust gas falls significantly as it flows through the exhaust-gas discharge system downstream of the heat exchanger.

The second sub-object, specifically that of specifying a method for operating a supercharged internal combustion engine of an above-described type, is achieved by means of a method wherein the liquid-type cooling arrangement of the compressor is operated such that the temperature of the compressed charge air does not fall below the dew point temperature of the water contained in the charge air.

That which has been stated in connection with the internal combustion engine according to the present application likewise applies to the method according to the present application.

Method variants are advantageous in which the cooling liquid is heated in the heat exchanger in order that the temperature of the compressed charge air does not fall below the dew point temperature of the water contained in the charge air.

Here, method variants are advantageous in which the cooling liquid is heated in the heat exchanger after a cold start of the internal combustion engine.

FIG. 1 is a schematic diagram of a first embodiment showing a liquid-type cooling arrangement 10 for a supercharged internal combustion engine 1 that may be implemented in a vehicle, such as a vehicle configured for road travel. The engine 1 comprises an intake line 13a arranged in an intake system 13 for supplying charge air to the internal combustion engine 1. A compressor 11 is arranged in the intake line 13a and is supplied air by an air intake 21 positioned upstream of the compressor 11. The charge air is passed from the compressor 11 to a liquid-cooled charge-air cooler 12, provided downstream the compressor 11, for cooling the compressed charge air. The engine 1 further comprises an exhaust line 16 arranged in an exhaust-gas discharge system for discharging exhaust gases and an exhaust-gas recirculation arrangement (EGR), not shown, wherein the recirculation line branches off from the exhaust-gas discharge system and issues into the intake system 13 upstream the compressor 11.

To form an engine cooling arrangement 2, a high-temperature circuit (dashed lines) is provided. Internal combustion engine 1 comprises a liquid-cooled cylinder head 1a and a liquid-cooled cylinder block 1b, wherein coolant is supplied to the cylinder block 1b at the inlet side via a feed opening 3. The liquid-cooled cylinder head 1a has a coolant jacket which is supplied secondarily, via cylinder block 1b, with coolant. For the discharge of the coolant, a discharge opening 4 is provided in the cylinder head 1a at the outlet side, out of which discharge opening the coolant of the coolant jacket associated with the block, and the coolant of the coolant jacket integrated in the cylinder head 1a, can be discharged.

To form a circuit, the outlet-side discharge opening 4 can be connected to the inlet-side feed opening 3, specifically via recirculation line 5, in which there is arranged a radiator 6, and/or via bypass line 9 which bypasses the radiator 6, wherein both the bypass line 9 and also the recirculation line 5 issue into a thermostat valve 7 from which a feed line 8 leads to the inlet-side feed opening 3.

In addition to the high-temperature circuit of the engine cooling arrangement 2, the compressor 11, arranged in the intake line 13a, is equipped with a liquid-type cooling arrangement 10, in the present case with a low-temperature cooling arrangement (solid lines), for which purpose, the compressor housing 11a, herein also referred to as the housing, has at least one integrated coolant duct. The low-temperature circuit 10 may incorporate the compressor 11 and a charge-air cooler 12. The compressor 11 may be a constituent part of an exhaust-gas turbocharger or may be a mechanical charger. The low-temperature circuit 10 cooling liquid has a lower temperature relative to that of the high temperature circuit coolant in engine cooling arrangement 2.

The low-temperature circuit 10 leads through the at least one coolant duct integrated in the housing 11a and, upstream of the housing 11a, through a heat exchanger 14 which can be used for heating the cooling liquid. To bypass the heat exchanger 14, a bypass line 15 is provided which branches off from the cooling circuit 10 upstream of the heat exchanger 14 and which issues into the cooling circuit 10 again between the housing 11a and the heat exchanger 14. A shut-off element 15a is arranged in the bypass line 15. The shut-off element may be switched to allow flow through either the heat exchanger or the bypass line. For example, the shut-off element may be operated in a continuously variable fashion. The heat exchanger 14 is coupled to the exhaust-gas discharge system such that a hot exhaust-gas flow in exhaust line 16 serves as a heat source 16a for heating the cooling liquid in the low-temperature circuit 10.

The low-temperature cooling circuit 10 of engine 1 supplies cooling liquid to the compressor 11 and a charge-air cooler 12. The cooling liquid is supplied to the compressor, wherein the compressor housing has at least one integrated coolant duct, and the charge-air cooler 12 from the heat exchanger 14 upstream of the housing. Low temperature coolant is discharged from the compressor 11 and charge-air cooler 12 and sent to pump 18, which serves to circulate the coolant. To form the low-temperature circuit, pump 18 delivers the cooling liquid to a radiator 17, for cooling the cooling liquid, and then back to the heat exchanger.

Figure 2:
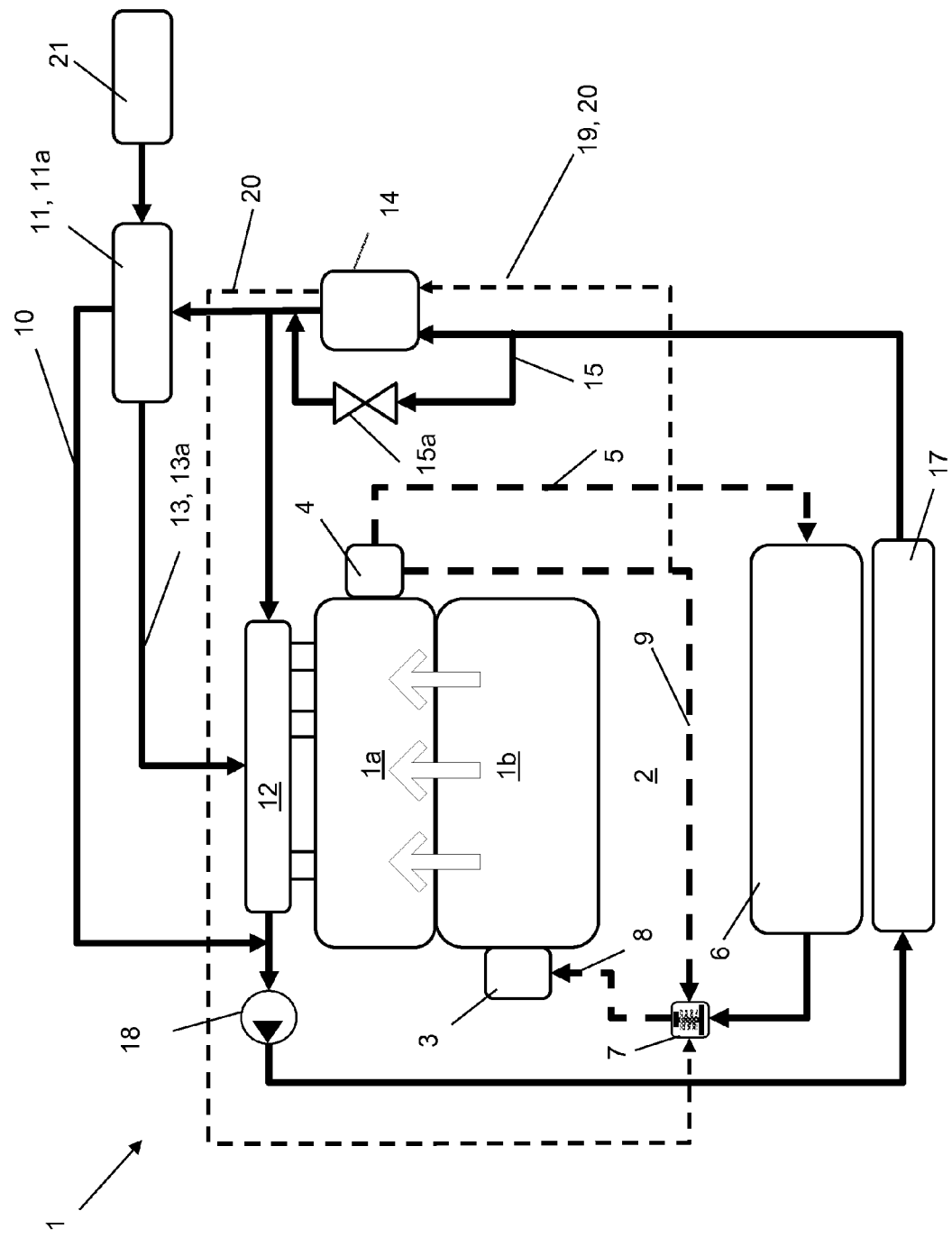
FIG. 2 schematically shows a second embodiment of the supercharged internal combustion engine.

FIG. 2 schematically shows a second embodiment of the internal combustion engine 1. It is sought to explain the differences in relation to the embodiment illustrated in FIG. 1, for which reason reference is otherwise made to FIG. 1 and the associated description. The same reference symbols have been used for the same components.

The heat exchanger 14 is coupled to the high-temperature circuit forming the engine cooling arrangement 2 such that coolant, which is heated in the cylinder head 1a and cylinder block 1b from the high-temperature circuit, serves as a heat source 19 for heating the cooling liquid of the low-temperature circuit 10. Thus, a supply line 20, which branches off from the bypass line 9 of the engine cooling arrangement 2, leads through the heat exchanger 14 and issues into the thermostat valve 7 at the inlet side. Thus, the cooling liquid is heated in the heat exchanger via the coolant in a separate cooling circuit.

Figure 3:
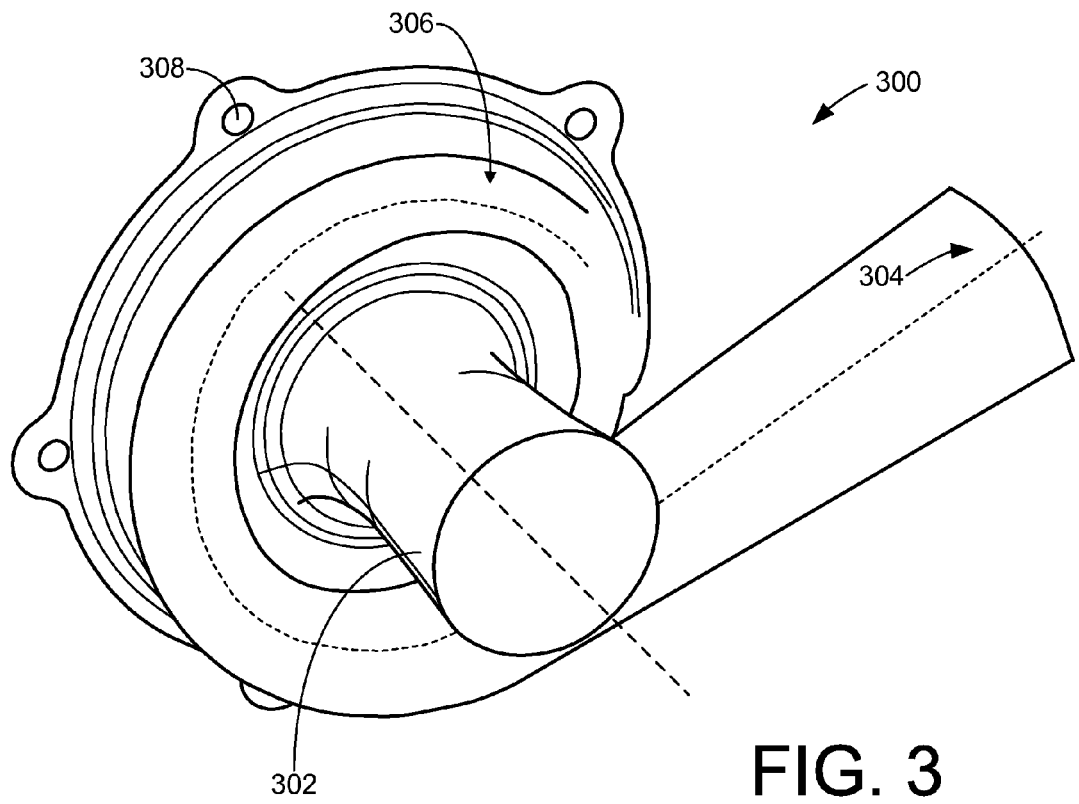
FIG. 3 schematically shows an example of a compressor with multi-part housing.

FIG. 3 shows a schematic 300 of a compressor comprising a multi-part housing. The compressor has an air inlet 302, wherein, for example, a mixture of ambient air and recirculated exhaust-gas air may flow into the compressor, and a compressor air discharge 304, wherein the compressed air is directed towards the engine cylinders. The compressor housing 306 is of modular form as a multi-part housing. In one example, the housing comprises at least two housing segments which may be joined together using screws through holes 308. In another example, the housing segments may be joined together by welds.

Figure 4:
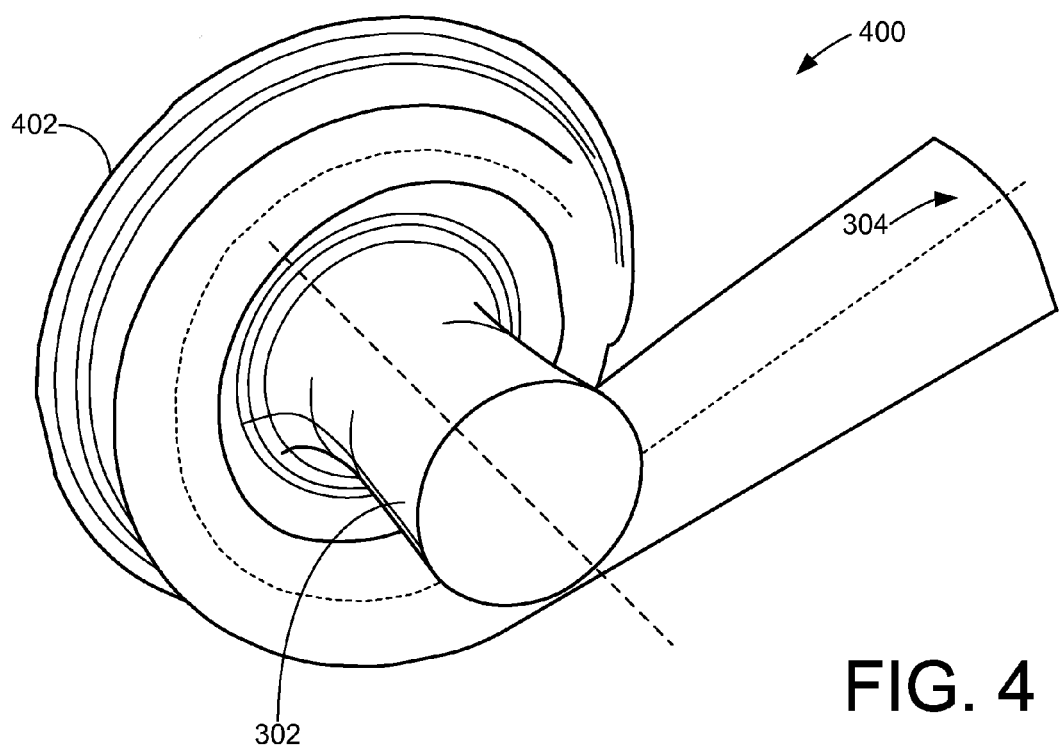
FIG. 4 schematically shows an example of a compressor with unipartite housing.

FIG. 4 shows a schematic 400 of a compressor housing comprising unipartite form housing. The housing 402 is a single seamless piece with no joints, welds, seams, etc. For example, the housing may be cast aluminum with no connecting elements present.

Figure 5:
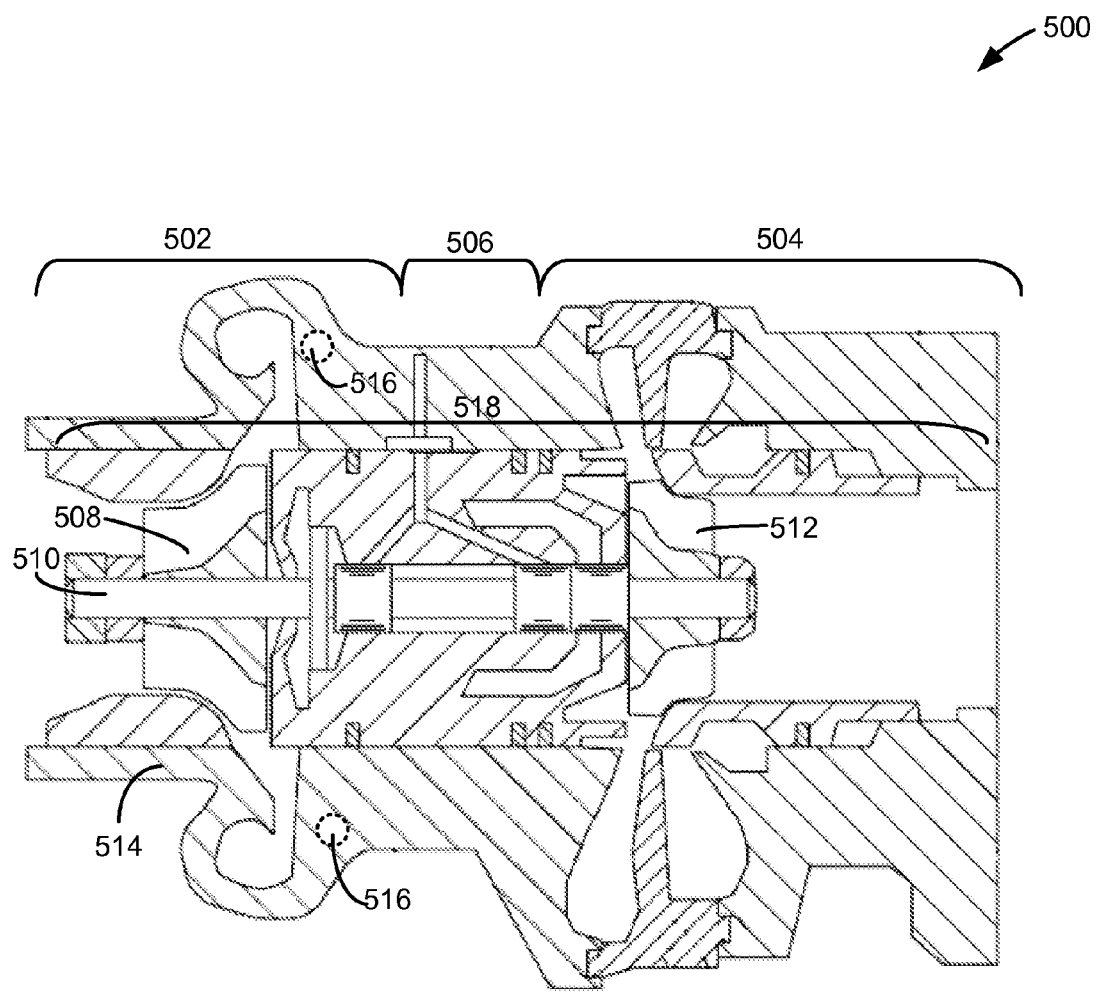
FIG. 5 schematically shows a turbocharger with an integrated coolant duct in the compressor housing.

FIG. 5 shows a schematic 500 of a compressor which is a constituent part of an exhaust-gas turbocharger, wherein the compressor housing has at least one integrated coolant duct. The turbocharger includes a compressor 502 comprising a compressor rotor 508 and a turbine 504 including a turbine rotor 512. The turbine 504 may be driven via exhaust gas flow and may spin the compressor. The compressor 502 may be configured to increase the pressure of the intake air. The turbocharger may further include a rotatable shaft 510, rotatably coupling the compressor rotor 508 to the turbine rotor 512, passing through the bearing housing 506. The turbine rotor 512, compressor rotor 508, and the rotatable shaft 510 are included in an adjustable core 518. A housing 514 circumferentially surrounds at least a portion of the adjustable core 518. In one example, the housing 514 circumferentially encloses the compressor rotor 508, turbine rotor 512 and the rotatable shaft 510. The housing 514 further has at least one integrated coolant duct 516 on the compressor side. The coolant duct 516 extends through the housing 514 and is configured to circulate coolant through the compressor housing to remove heat from the charge air, for example. In another example, the coolant duct may circulate coolant from a heat exchanger to add heat to the charge air. The integrated coolant duct 516 may be connected to a liquid-type cooling arrangement, as shown in FIGS. 1 and 2, to form a coolant circuit.

Figure 6:
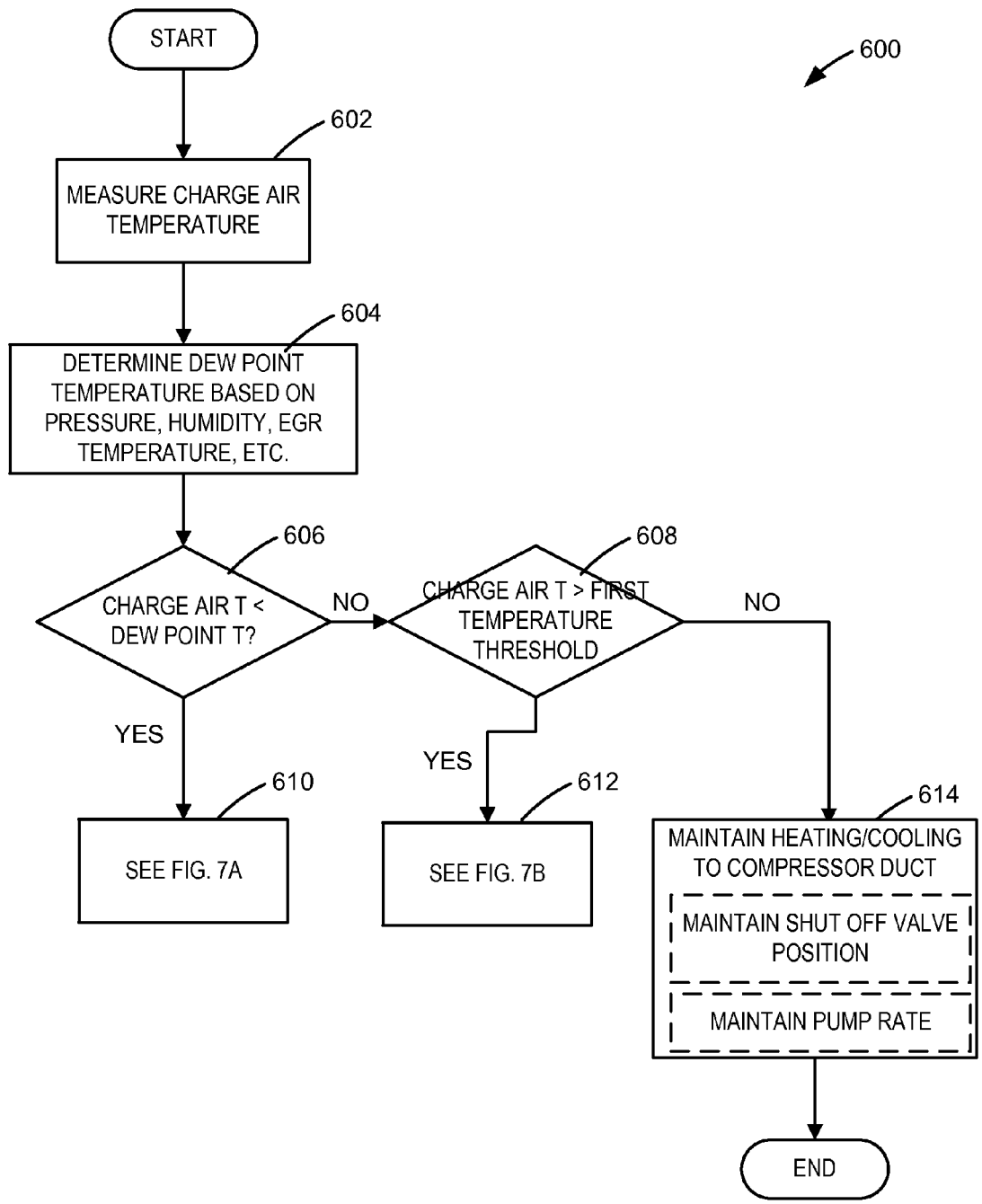
FIG. 6 illustrates an example method for a compressor cooling circuit.

FIG. 6 illustrates an example method 600 to operate a liquid-type cooling arrangement as illustrated in FIGS. 1 and 2. The method for example includes transferring heat from hot exhaust-gas or high-temperature coolant to coolant provided in a low-temperature cooling circuit. In examples where the heated coolant includes high temperature engine coolant, the heated coolant may be in separate cooling circuit from the low temperature coolant. The method may operate the cooling arrangement as intended, by cooling the charge air, or to increase the charge air temperature. The method also includes adjusting the low temperature coolant flow through the heat exchanger responsive to charge air temperature over a threshold.

At 602, the method may measure the charge air temperature. The charge air temperature may be measured downstream of the compressor in the intake line by an intake temperature sensor, for example. The charge air temperature may be measured in the compressor, in another example.

At 604, the method may determine the dew point temperature of a gaseous component. The fresh air and recirculated exhaust-gas contain multiple gaseous components that may condense below a specific temperature, herein referred to as the dew point temperature. The dew point temperature may be determined based on the ambient temperature, ambient pressure, humidity, EGR flow rate, etc. In one example, the dew point temperature may be based on properties of water.

At 606, the method may determine if the charge air temperature is below the dew point temperature. If the charge air temperature is below the dew point temperature, the method may proceed to 610 and continue at FIG. 7A to increase the temperature in the low temperature coolant circuit. For example, a charge air temperature below the point may allow condensation to form in the intake line. If the charge air temperature is not below the dew point temperature, the method may proceed to 608.

At 608, the method may determine if the charge air temperature is above a first temperature threshold. The first temperature threshold may be based on a compression temperature that yields a higher density of the compressed combustion air, for example. If the charge air temperature is above the first temperature threshold, the method may proceed to 612 and continue at FIG. 6B. If the charge air temperature is not above the first temperature threshold, the method may proceed to 614 and maintain the heating or cooling to the compressor ducts. In one example, the shut-off element, herein also referred to as shut-off valve, position may be maintained and the pump rate may be maintained. The method may then end.

Figure 7A:
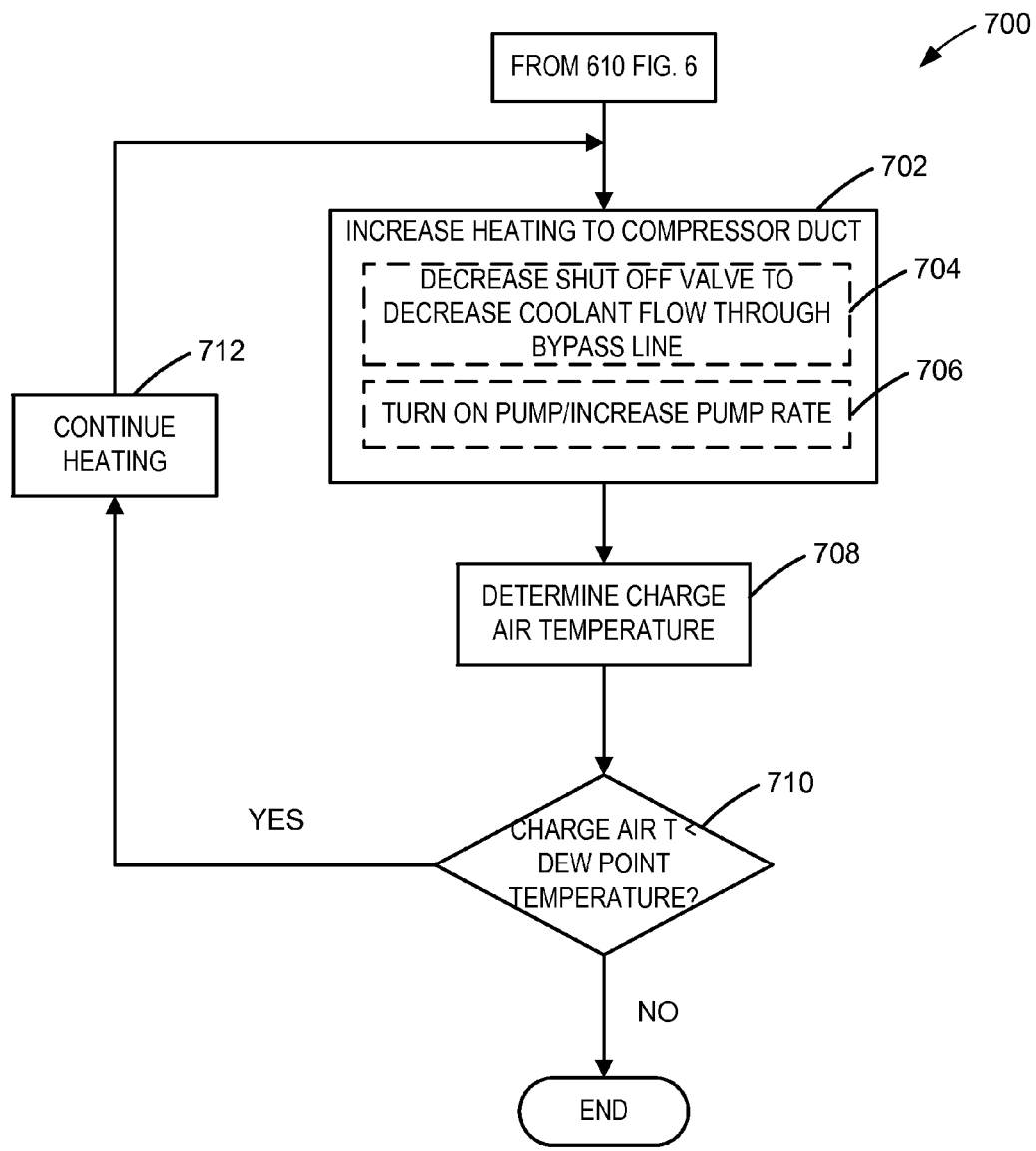
FIGS. 7A and 7B illustrate heating and cooling of a compressor cooling circuit.

Turning to FIG. 7A, when the charge air temperature is below a dew point, the method 700 may increase heating to the compressor duct arranged in the liquid-type cooling arrangement at 702. In order to increase heating to the compressor, the method may decrease the shut-off valve opening at 704 to decrease coolant flow through the bypass line. This increases the low temperature coolant flow through the heat exchanger and then passes the low temperature coolant from the heat exchanger directly to the intake compressor housing coolant duct, thereby increasing the charge air temperature. Further, the method may operate the pump at 706 to increase the coolant flow rate.

At 708, the method may determine the charge air temperature.

At 710, the method may determine if the charge air temperature is less than the dew point temperature. If yes, the charge air temperature is below the dew point temperature, additional heating is applied to the system at 712. If no, the charge air temperature is above the dew point temperature, the method may end.

Figure 7B:
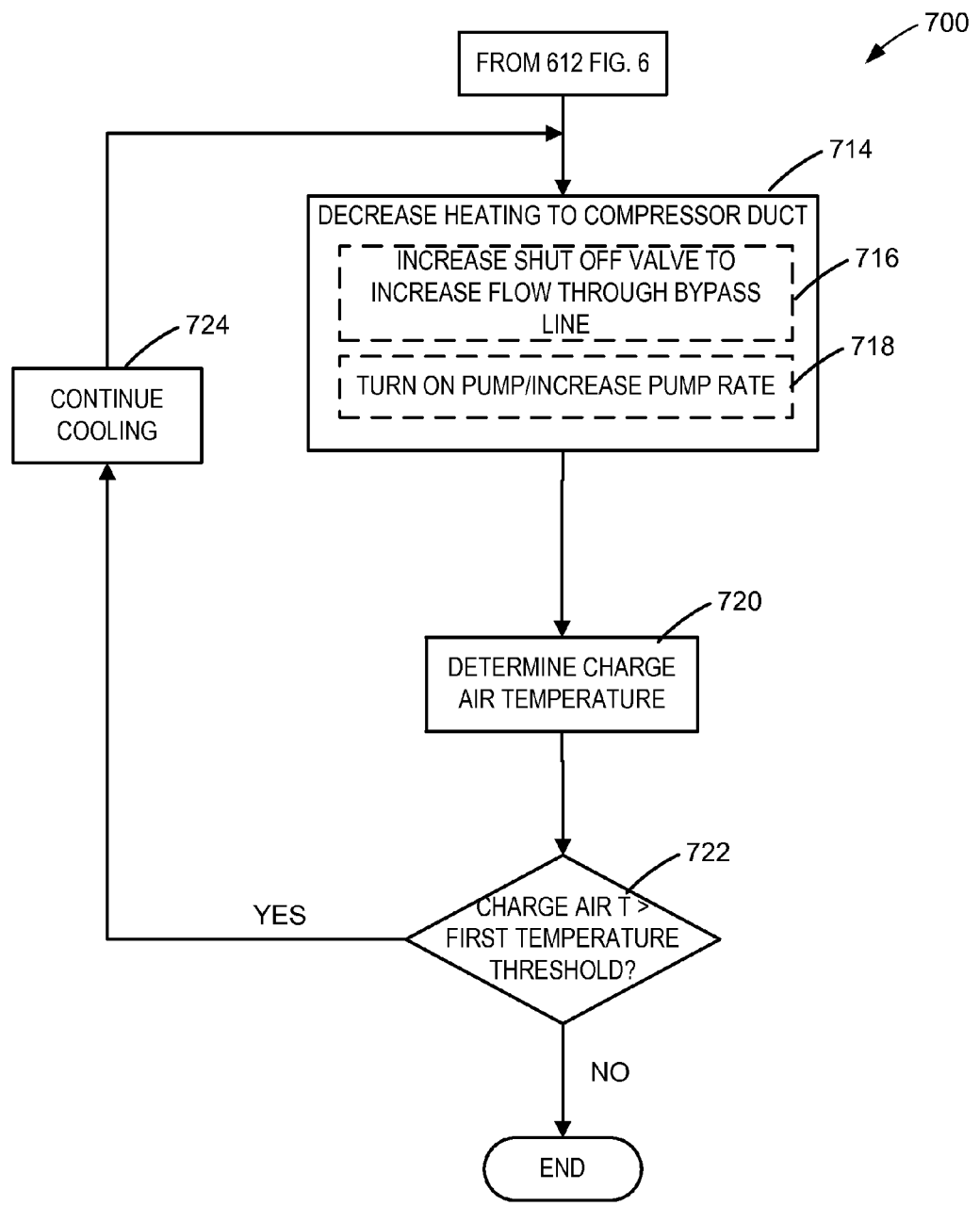

Turning to FIG. 7B, when the charge air temperature is above a first threshold temperature, the method 700 may decrease heating to the compressor duct arranged in the liquid-type cooling arrangement at 714. In order to decrease heating to the compressor duct, low temperature coolant flow through the heat exchanger is decreased. The method may increase the shut-off valve opening at 716 to decrease coolant flow through the heat exchanger and increase coolant flow through the bypass line. Further, the method may increase the pump rate to circulate more low temperature coolant at 718.

At 720, the method may determine the charge air temperature.

At 722, the method may determine if the charge air temperature is above the first temperature threshold. If yes, the method may continue cooling at 724. If no, the method may end.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system. It will be appreciated that the configurations and routines disclosed herein are exemplary in nature because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A supercharged internal combustion engine, comprising:
    at least one intake line, arranged in an intake system, for supplying charge air from a charge air cooler to the internal combustion engine;
    at least one exhaust line, arranged in an exhaust-gas discharge system, for discharging exhaust gases;
    at least one compressor, arranged in the at least one intake line, which comprises at least one rotor mounted on a rotatable shaft and a housing in which said at least one rotor is arranged, wherein the compressor is equipped with a liquid-type cooling arrangement, for which purpose, the housing has at least one integrated coolant duct, an exhaust-gas recirculation arrangement, the recirculation line of which branches off from the exhaust-gas discharge system and issues into the intake system upstream the compressor;
    wherein, to form the liquid-type cooling arrangement, a cooling circuit is provided which leads through the at least one coolant duct integrated in the housing, wherein a heat exchanger is arranged in the cooling circuit upstream of the housing, which heat exchanger serves for heating a cooling liquid passing through the integrated coolant duct; and
    the at least one compressor is a constituent part of an exhaust-gas turbocharger.

2. The supercharged internal combustion engine of claim 1, wherein a charge-air cooler is provided downstream of the at least one compressor.

3. The supercharged internal combustion engine of claim 1, wherein the at least one compressor is a radial compressor;
    the housing is of modular form as a multi-part housing; and
    the housing comprises at least two housing segments.

4. The supercharged internal combustion engine of claim 1, wherein the housing is of unipartite form.

5. The supercharged internal combustion engine of claim 1, wherein a bypass line for bypassing the heat exchanger is provided;
   wherein the bypass line branches off from the cooling circuit upstream of the heat exchanger and issues into the cooling circuit again between the housing and the heat exchanger; and
   wherein a shut-off element is provided in the bypass line.

6. The supercharged internal combustion engine of claim 1 wherein the cooling circuit is a low temperature cooling circuit and a charge air cooler is arranged downstream of the housing in the low-temperature circuit.

7. The supercharged internal combustion engine of claim 1, wherein a high-temperature circuit is provided for forming an engine cooling arrangement; and
   wherein the heat exchanger is coupled to the engine cooling arrangement such that coolant from the high-temperature circuit serves as a heat source for heating the cooling liquid.

8. The supercharged internal combustion engine of claim 1, wherein the heat exchanger is coupled to the exhaust-gas discharge system such that the hot exhaust gas from the internal combustion engine serves as a heat source for heating the cooling liquid.

9. The supercharged internal combustion engine of claim 1, wherein the heat exchanger is electrically heatable such that the cooling liquid can be electrically heated.

10. A method comprising:
    transferring heat from a heated coolant to an low temperature coolant via a heat exchanger;
    adjusting the low temperature coolant flow through the heat exchanger responsive to charge air temperature over a threshold; and
    passing the heated low temperature coolant from the heat exchanger directly to an intake compressor housing.

11. The method of claim 10, wherein adjusting includes increasing the low temperature coolant flow when the charge air temperature is below a dew point temperature threshold.

12. The method of claim 11, wherein the dew point temperature threshold is determined based on properties of water.

13. The method of claim 10, further comprising decreasing the low temperature coolant flow when the charge air temperature is above a first temperature threshold.

14. The method of claim 10, further comprising increasing the low temperature coolant temperature during a cold start of the internal combustion engine.

15. The method of claim 10, wherein the recirculated exhaust gas serves as heat source for heating the coolant in the heat exchanger.

16. The method of claim 10, wherein the heated coolant is high temperature engine coolant in a separate cooling circuit from the low temperature coolant.

17. A method, comprising:
    switching a shut-off valve, positioned in a bypass line which branches off from a cooling circuit upstream of a heat exchanger and issues into the cooling circuit again between a compressor housing and the heat exchanger, to a closed position when a charge air temperature is below a dew point; and
    switching the shut-off valve, positioned in the bypass line, to an open position when the charge air temperature is above a first threshold.

18. The method of claim 17, wherein switching the shut-off valve to the closed position blocks coolant flow through the bypass line and allows coolant flow through the heat exchanger.

19. The method of claim 17, wherein switching the shut-off valve to the open position allows coolant flow through the bypass line and blocks coolant flow through the heat exchanger.

* * * * *